(12) United States Patent
Zhang et al.

(10) Patent No.: US 12,055,525 B2
(45) Date of Patent: Aug. 6, 2024

(54) TEST DEVICE SUITABLE FOR ACCELERATORY OBLIQUE WATER ENTRY OF A WEDGE

(71) Applicant: DALIAN UNIVERSITY OF TECHNOLOGY, Liaoning (CN)

(72) Inventors: Guiyong Zhang, Liaoning (CN); Shuwen Shi, Liaoning (CN); Tiezhi Sun, Liaoning (CN); Yingjie Gao, Liaoning (CN); Taian Hu, Liaoning (CN); Chenrui Tian, Liaoning (CN); Bo Zhou, Liaoning (CN); Zhe Sun, Liaoning (CN); Yichen Jiang, Liaoning (CN); Yuguo Pei, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 401 days.

(21) Appl. No.: 17/596,258

(22) PCT Filed: Jul. 2, 2020

(86) PCT No.: PCT/CN2020/099878
§ 371 (c)(1),
(2) Date: Dec. 6, 2021

(87) PCT Pub. No.: WO2021/073166
PCT Pub. Date: Apr. 22, 2021

(65) Prior Publication Data
US 2022/0307956 A1    Sep. 29, 2022

(30) Foreign Application Priority Data

Oct. 18, 2019 (CN) .......................... 201910996064.4
Oct. 18, 2019 (CN) .......................... 201921764715.9

(51) Int. Cl.
*G01N 3/02* (2006.01)
*G01M 17/00* (2006.01)
*G01N 3/303* (2006.01)

(52) U.S. Cl.
CPC ............ *G01N 3/303* (2013.01); *G01M 17/00* (2013.01); *G01N 3/02* (2013.01); *G01N 2203/0044* (2013.01)

(58) Field of Classification Search
CPC .. G01N 3/303; G01N 3/02; G01N 2203/0044; G01M 17/00
(Continued)

(56) References Cited

FOREIGN PATENT DOCUMENTS

| CN | 106124159 A | 11/2016 |
|---|---|---|
| CN | 108613793 A | 10/2018 |

(Continued)

*Primary Examiner* — Alexander A Mercado
*Assistant Examiner* — Rodney T Frank
(74) *Attorney, Agent, or Firm* — NKL Law; Allen Xue

(57) ABSTRACT

A test device suitable for acceleratory oblique water entry of a wedge has a frame, a water tank placed below the frame, an accelerator installed above the frame, an obliquing device connected to the frame, a wedge connected to the obliuqing device and an observation system. The frame is provided with vertical slide rails and a transverse slide rail. The accelerator mainly includes an air cylinder and an air compressor. The wedge is a flexible wedge or a rigid wedge. The observation system includes a pressure sensor, a strain sensor, a velocity sensor, an acceleration sensor and a particle image velocimetry device. The repeatability of the test process can be ensured by controlling the output pressure of the air cylinder.

9 Claims, 9 Drawing Sheets

(58) Field of Classification Search
USPC .......................................................... 73/12.06
See application file for complete search history.

(56) References Cited

FOREIGN PATENT DOCUMENTS

| | | |
|---|---|---|
| CN | 109781383 A | 5/2019 |
| CN | 109974966 A | 7/2019 |
| CN | 110553815 A | 12/2019 |
| CN | 210638878 U | 5/2020 |
| JP | 2009121855 A | 6/2009 |

TEST DEVICE SUITABLE FOR ACCELERATORY OBLIQUE WATER ENTRY OF A WEDGE

TECHNICAL FIELD

The present disclosure relates to the technical field of marine engineering, in particular to a test device suitable for acceleratory oblique water entry of a wedge.

BACKGROUND

The problem of water entry exists widely in the field of naval architecture and marine engineering, such as the prediction of slamming force and deformation after slamming of ship hull during sailing in stormy waves, and the accurate judgment and tracking of the movement of torpedo body and the like after water entry. The research of water entry is of great significance in both civil and military fields. However, the problem of water entry is often accompanied with fluid violent disturbance and object deformation, and they affect each other, which brings some difficulties to the research. In order to solve the above difficulties, the test method is adopted. As an effective research method in engineering field, model test is also applicable to the water entry problem. However, there are some problems in the prior art, such as lower velocity when the water entry test is carried out in the way of free fall, larger overall size of the test device, and inconvenient implementation due to high conditions required for the test.

SUMMARY OF THE INVENTION

According to the above-mentioned technical problems of larger overall size of the test device for water entry test, lower water entry velocity and inconvenient implementation due to high conditions required for the test, the present disclosure provides a test device suitable for acceleratory oblique water entry of a wedge. The present disclosure achieves the acceleration of the wedge and the obliquing device by means of the air compressor driving the air cylinder to generate thrust to push the fastening slide block of the transverse slide rail, so that the wedge enters into the water at a required angle and velocity, thereby observing the changes of local pressure, deformation quantity and flow field in the process. The present disclosure can observe the various physical phenomena of actual water entry problems. The wedge is accelerated by the thrust of the air cylinder to make it fall into the water at a certain angle and required velocity, thereby ensuring the stability and repeatability of the whole device.

The technical solutions adopted by the present disclosure are as follows:

A test device suitable for acceleratory oblique water entry of a wedge, includes a frame, a water tank placed below the frame, an accelerator mounted above the frame, a obliquing device connected to the frame, a wedge connected to the obliquing device, and an observation system.

The frame includes a support and linear slide rails arranged on the support. The support is a rectangular frame made of aluminum profile and has a hollow structure composed of top profiles and support profiles perpendicular to the top profiles. The water tank is placed below the top profiles and is arranged on a movable base. Long profiles arranged on two sides of the top profiles are provided with vertical slide rails symmetrically arranged. The vertical slide rail and the long profile are jointly connected with a local reinforcement which can make the vertical slide more stable. The vertical slide rails on both sides are symmetrically provided with slide blocks, and the slide block on both sides are respectively connected to two ends of a transverse slide rail. The transverse slide rail is provided with a fastening slide block which is fixedly connected with the obliquing device. The upper ends of the vertical slide rails on both sides are jointly connected with a subplate, and a middle part of the subplate is provided with a through hole for fixing the accelerator.

The accelerator includes an air cylinder and an air compressor. The air compressor drives the air cylinder to generate thrust to push the fastening slide block of the transverse slide rail to achieve an acceleration of the wedge and the obliquing device. By controlling different output pressure of the air compressor, the air cylinder generates different thrust to achieve different water entry velocity of the wedge. A head of a piston rod of the air cylinder is provided with a flat plate having the same area of the top of the fastening slide block of the transverse slide rail, which is used to increase a contact area between the head and the slide block to provide more stable and uniform force.

The obliquing device includes a support rod. An upper end of the support rod is connected with the fastening slide block and a lower end is connected with a positioning block. One side of the positioning block is connected with an angle-modulated semicircle. The positioning block and the angle-modulated semicircle are provided with communicated threaded holes, and the two threaded holes are jointly connected by a connecting bolt. The relative position of the positioning block, the angle-modulated semicircle and the connecting bolt is adjusted by the rotation of the connecting bolt in the thread; in case of clearance, the gaskets should be installed at the required position to limit the displacement along the axial direction of the connecting bolt. The head of the connecting bolt is a cuboid block on which is provided with a first through hole, and an axis of the first through hole is parallel to a semicircular surface of the angle-modulated semicircle. An extension rod is connected in the first through hole, and the middle part of the extension rod is in connection with an angle-modulated block connected with the angle-modulated semicircle. The lower end of the extension rod is connected with the wedge, to achieve the wedge obliquely falling at a desired angle through the whole obliquing device.

The wedge is a flexible wedge or a rigid wedge.

The observation system includes pressure sensors, strain sensors, a velocity sensor, an acceleration sensor and a particle image velocimetry device (M). The pressure sensors are arranged at a cusp of the wedge and a midpoint on one side of that for measuring the pressure at specific points. The strain sensors are arranged at the cusp and a midpoint on one side of the wedge for measuring the deformation at specific points. The velocity sensor is arranged on a plate at the upper side of the cusp for measuring the velocity when the wedge entering the water. The acceleration sensor is arranged on the upper part of the wedge for obtaining the resultant force on the wedge. Tracer particles in the particle image velocimetry device are placed in the water, a laser lamp is arranged in the water tank frame, and a high-speed camera is arranged in front of the water tank to monitor a change of fluid velocity under the wedge. A variety of sensors can be arranged on the test device to observe different physical quantities in the test process. The variety of sensors and high-speed camera images constitute the complete observation system of the device.

In the working process, the test device undergoes three processes: balance state, acceleration process and buffer process.

The balance state: installing electromagnets on platforms extended from the vertical slide rails on both sides for catching the two ends of the transverse slide rail, and the air compressor in non-running, thereby the transverse slide rail in balance at a top of a stroke and ready to fall; wherein, the electromagnet enables the wedge and the obliquing device in a balance state by catching the transverse slide rail.

The acceleration process: the acceleration process comprising two steps, respectively, an acceleration process of a larger acceleration generated by the air cylinder thrust in the stroke of the air cylinder, and an acceleration process of free fall of the transverse slide rail outside the cylinder stroke.

The buffer process: after water entry observation of the wedge is completed, the slide block of the vertical slide rail moving to a position of a buffer spring and decelerating under an action of the buffer spring, the slide block stopping under the action of tension of a flexible rope when the whole stroke reaching the rope length of the flexible ropes.

Further, the lower parts of the vertical slide rails on both sides are provided with buffer springs for buffering the impact force of the transverse slide rail falling at a high speed.

Further, the position of the subplate is adjustable in a horizontal direction. The subplate can move left and right in a direction perpendicular to the long profiles of the top profiles (that is, the subplate can move horizontally along a direction of connection of the upper ends of the two vertical slide rails). After adjusting the position, the subplate is fixedly connected with the vertical slide rails through C-shaped clamps. By adjusting the position of the subplate, the piston rod of the air cylinder can accurately connect with a surface of the fastening slide block of the transverse guide rail.

Further, the support rod includes a second aluminum profile and sleeves having a plane installed at both ends of the second aluminum profile. The sleeve located at the upper end is connected with the fastening slide block, and the sleeve at the lower end is connected with the positioning block.

Further, an edge of the angle-modulated semicircle is provided with a circle of first threaded holes spaced at an angle of 5°. Both sides of the angle-modulated block are provided with second threaded holes spaced at an angle of 10°. The angle-modulated block is fixedly connected with the angle-modulated semicircle by the bolt jointly connected in the second threaded holes and the first threaded holes, wherein a curvature of the second threaded hole is the same as a distance from the first threaded hole to a center of the angle-modulated semicircle. Therefore, in order to enable the extension rod reach the desired obliquing angle, the two second threaded holes of the angle-modulated block connect to the first threaded holes with the corresponding angle of the angle-modulated semicircle plus or minus 5°, and the threaded holes of the two devices are screwed together with bolts to fix.

Further, the upper and lower sides of the connection between the connecting bolt and the extension rod are provided with at least two nuts. The upper and lower sides of the connection between the angle-modulated block and the extension rod are provided with at least two nuts. The connection between the connecting bolt and the extension rod and the connection between the angle-modulated block and the extension rod are both provided with external threads. The longitudinal displacement of the extension rod is limited by setting nuts on the upper and lower sides of the connecting bolt and the angle-modulated block.

Further, both ends of the transverse slide rail are connected with flexible ropes, and the other ends of the two flexible ropes are respectively connected with two ends of the subplate, for buffering the impact force of high-speed falling and protecting the device.

Further, the design of the frame mainly meets two requirements: 1. The frame can be arranged with water tank, and can be assembled with acceleration devices (air cylinder and air compressor), various sensors, the obliquing device (angle-modulated device), the wedge fixing device, the high-speed camera and the laser lamp for PIV, etc.; 2. The frame can withstand the impact force of the wedge and other devices falling at high speed. Based on the above two requirements, the large-size 6060 aluminum profile is used to build the whole frame, and necessary reinforcing device and buffer device are added at local position. The reinforcing device is the local reinforcement structure for stabilizing the vertical slide rails, and the buffer device is the buffer spring installed at the lower part of the vertical slide rail and connecting both ends of the transverse slide rail with the subplate by flexible ropes, for buffering the impact force of high-speed falling and protecting the device.

Further, the flexible wedge is a plate with a thickness of 5 mm, a length of 600 mm and a width of 300 mm, the deadrise angles of 10°, 15° and 20° are respectively folded from the cusp of the plate, and a vertical plate with holes is welded at the sharp corner of the bend twist to connect. The rigid wedge is to cover the side not in contact with water of the plate with a board on the basis of the flexible wedge to meet the requirements of rigidity. A weight of the flexible wedge is the same as that of the rigid wedge, wherein the flexible wedge is added a counterweight the same as the weight of the board. The vertical plate with holes is welded on the line the cusp of the wedge located, wherein the holes are symmetrically arranged on two sides of the thick plate for installing counterweight to adjust the weight of the whole wedge device. The thick plate with holes welded on the line the cusp of the wedge located can not only enable the flexible deformation at the cusp small, but also provide the installation holes for connecting the extension rod.

Further, the two sides of the angle-modulated semicircular are provided with some gaskets for limiting the displacement of the connecting bolt along a direction of the extension rod.

Further, the core part of the obliquing device is the angle-modulated semicircle and the angle-modulated block. By combining these two devices and the connecting bolt assembled at the angle-modulated semicircle to fix the extension rod of the wedge, the wedge always obliques at a fixed angle during the test.

Further, the obliquing angles of the wedge is changed by the angle-modulated device, and combined with the rigid wedge, flexible wedge and different velocities as different control groups of the test.

Further, the whole test device is about 2 m high, which is compact in structure and convenient in implementation.

Further, the test device enables the wedge fall into the water at a required angle and velocity by the air cylinder thrust accelerating the obliquing device and the wedge, thereby observing the changes of local pressure, deformation quantity and flow field during the process.

Compared with the prior art, the present disclosure has the following advantages:

1. The present disclosure provides a test device suitable for acceleratory water entry of a wedge, which enables the wedge fall into the water at a required angle and velocity by the air cylinder thrust accelerating the obliquing device and the wedge, thereby observing the changes of local pressure, deformation quantity and flow field during the process. It can ensure the stability and repeatability of the whole device by the air cylinder thrust accelerating the wedge to make it fall into water at a certain angle and required velocity.

2. The test device suitable for acceleratory obliquing water entry of a wedge provided in the present disclosure, the whole device has compact layout, easy implementation and cost saving, and the repeatability of the test process can be ensured by controlling the output pressure of the air cylinder.

3. The test device suitable for acceleratory obliquing water entry of a wedge provided in the present disclosure, compared with the traditional water entry device, can achieve more accurate and larger water entry velocity in a shorter wedge movement stroke and has more observation methods.

In conclusion, the technical solution of the present disclosure can solve the problems such as larger overall size of the water entry test device, lower water entry velocity, and inconvenient implementation caused by higher test conditions in the prior art.

Based on the above reasons, the present disclosure can be widely popularized in the field of naval architecture and marine engineering.

DETAILED DESCRIPTION OF DRAWINGS

To explain the embodiments of the present disclosure or the technical solutions in the prior art more clearly, the following briefly describes the drawings required for describing the embodiments or the prior art. Apparently, the drawings in the following description show some embodiments of the present disclosure, and those ordinary skilled in the art may still derive other drawings from these drawings without creative efforts.

Figure 1:
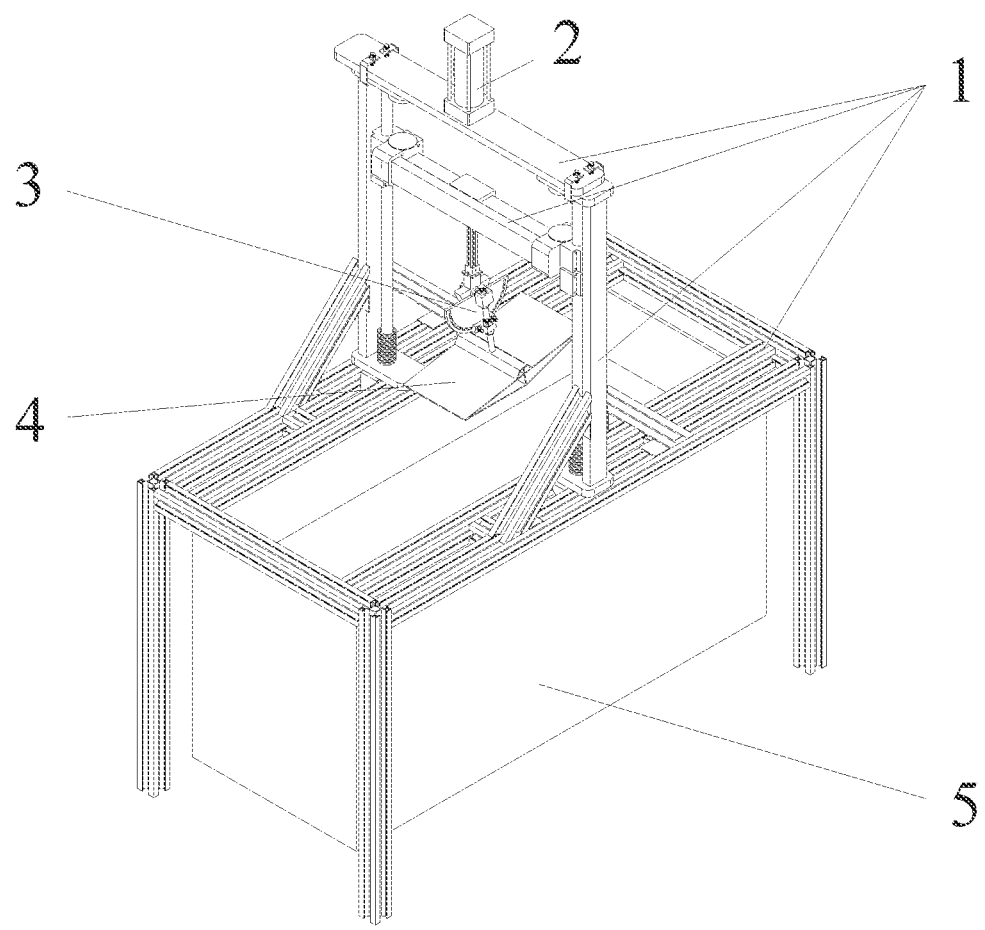
FIG. 1 is an axonometric drawing of the overall arrangement in the present disclosure.

Wherein: 1. frame; 2. accelerator; 3. obliquing device; 4. wedge; 5. water tank; 6. support; 7. vertical slide rail; 8. subplate; 9. transverse slide rail; 10. local reinforcement; 11. buffer spring; 12. sleeve; 13. positioning block; 14. angle-modulated semicircle; 15. connecting bolt; 16. angle-modulated block; 17. counterweight; 18. extension rod; 19. second aluminum profile.

DETAILED DESCRIPTION OF PREFERRED EMBODIMENTS

It should be noted that, in the case of no conflicts, the embodiments and the features in the embodiments of the present disclosure can be combined mutually. The present disclosure will be described in detail below with reference to the accompanying drawings and the embodiments.

To make the objectives, technical solutions, and advantages of the present disclosure clearer, the following clearly and completely describes the technical solutions in the embodiments of the present disclosure with reference to the accompanying drawings in the embodiments of the present disclosure. Apparently, the described embodiments are merely some rather than all of the embodiments. The following description of at least one exemplary embodiment is actually only illustrative, and in no way serves as any limitation on the present disclosure and its application or use. Based on the embodiments of the present disclosure, all the other embodiments obtained by those of ordinary skill in the art without inventive effort are within the protection scope of the present disclosure.

It should be noted that the terms used herein are only intended to describe specific embodiments and are not intended to limit the exemplary embodiments of the present disclosure. As used herein, unless indicated obviously in the context, a singular form is intended to include a plural form. Furthermore, it should be further understood that the terms "include" and/or "comprise" used in this specification specify the presence of features, steps, operations, devices, components and/or of combinations thereof.

Unless specifically stated otherwise, the relative arrangement of components and steps, numerical expressions, and numerical values set forth in these embodiments do not limit the scope of the present disclosure. In addition, it should be clear that, for ease of description, sizes of the various components shown in the accompanying drawings are not drawn according to actual proportional relationships. Technologies, methods, and devices known to those of ordinary skill in the relevant fields may not be discussed in detail, but where appropriate, the technologies, methods, and devices should be considered as a part of the authorization specification. In all the examples shown and discussed herein, any specific value should be interpreted as merely being exemplary rather than limiting. Therefore, other examples of the exemplary embodiment may have different values. It should be noted that similar reference signs and letters represent similar items in the accompanying drawings below. Therefore, once an item is defined in one accompanying drawing, the item does not need to be further discussed in a subsequent accompanying drawing.

In the description of the present disclosure, it should be noted that orientations or position relationships indicated by orientation terms "front, rear, upper, lower, left, and right", "transverse, vertical, perpendicular, and horizontal", "top and bottom", and the like are usually based on orientations or position relationships shown in the accompanying drawings, and these terms are only used to facilitate description of the present disclosure and simplification of the description. In the absence of description to the contrary, these orientation terms do not indicate or imply that the apparatus or element referred to must have a specific orientation or be constructed and operated in a specific orientation, and therefore cannot be understood as a limitation on the protection scope of the present disclosure: orientation words "inner and outer" refer to the inside and outside relative to the contour of each component.

For ease of description, spatially relative terms such as "on", "over", "on the upper surface", and "above" can be used here to describe a spatial positional relationship between one device or feature and another device or feature shown in the figures. It should be understood that the spatially relative terms are intended to include different orientations in use or operation other than the orientation of the device described in the figure. For example, if the device in the figure is inverted, the device described as "above another device or structure" or "on another device or structure" is then be positioned as being "below another device or structure" or "beneath a device or structure". Therefore, the exemplary term "above" can include both orientations "above" and "below". The device can also be positioned in other different ways (rotating by 90 degrees or in another orientation), and the spatially relative description used herein is explained accordingly.

In addition, it should be noted that using terms such as "first" and "second" to define components is only for the convenience of distinguishing the corresponding components. Unless otherwise stated, the foregoing words have no special meaning and therefore cannot be understood as a limitation on the protection scope of the present disclosure.

Embodiment 1

Figure 2:
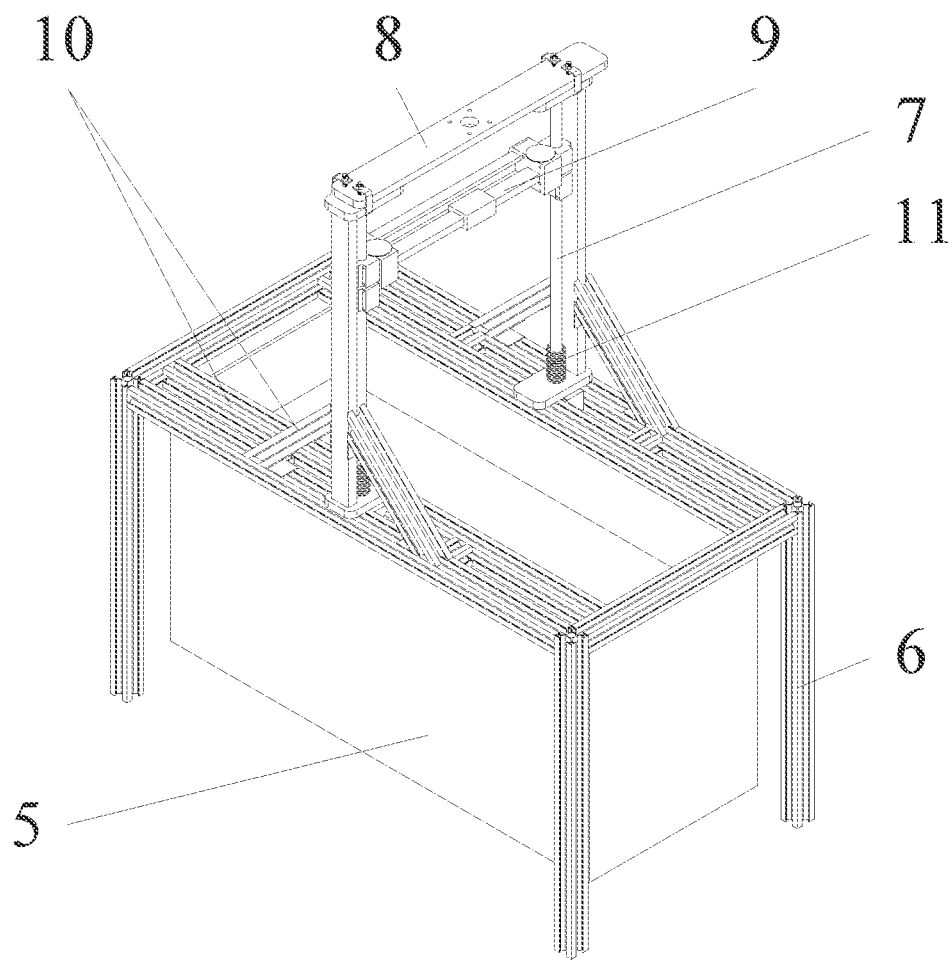
FIG. 2 is an axonometric drawing of the frame structure in the present disclosure.
Figure 3:
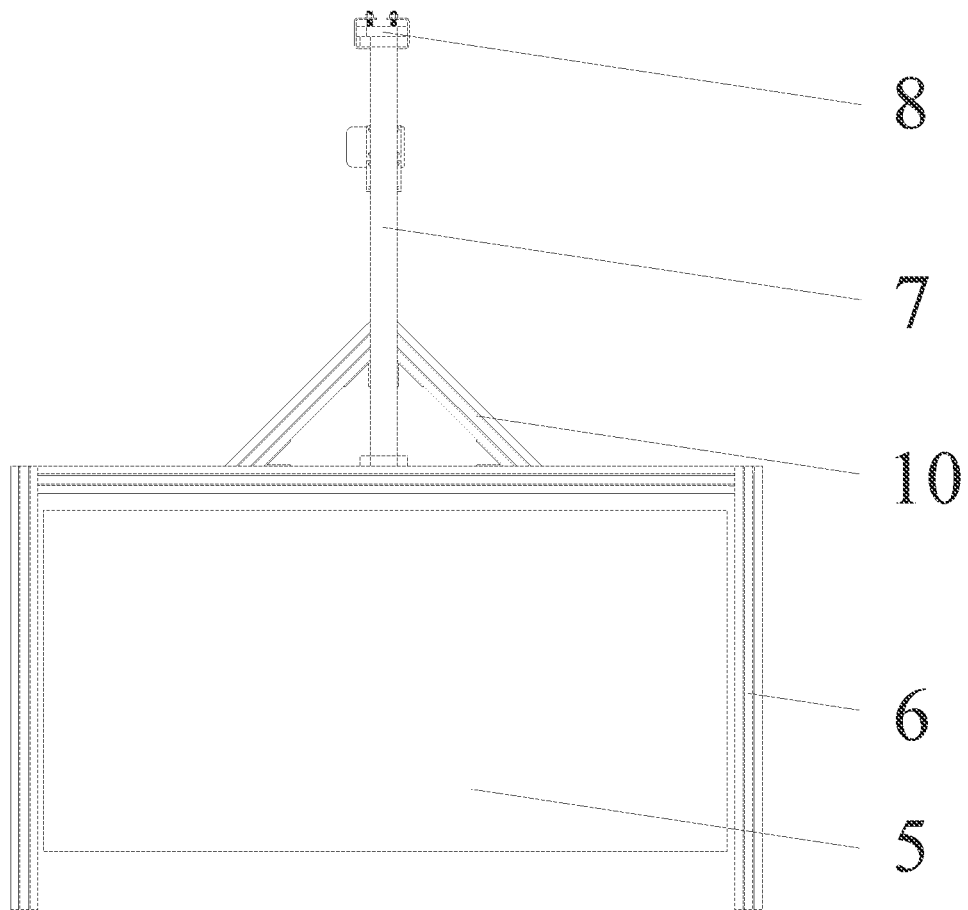
FIG. 3 is a front view of the frame structure in the present disclosure.
Figure 4:
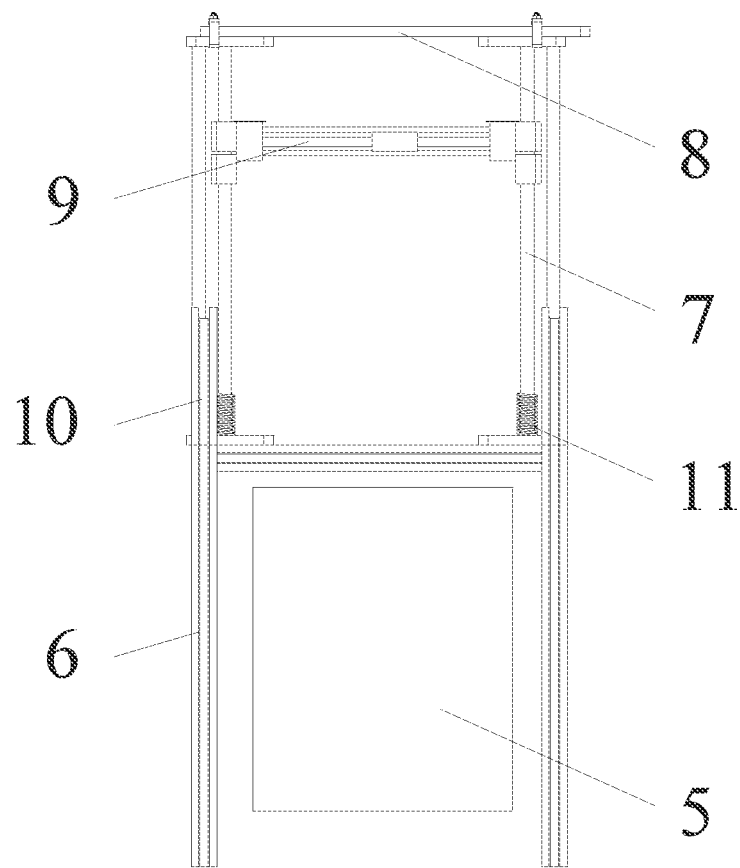
FIG. 4 is a side view of the frame structure in the present disclosure.
Figure 5:
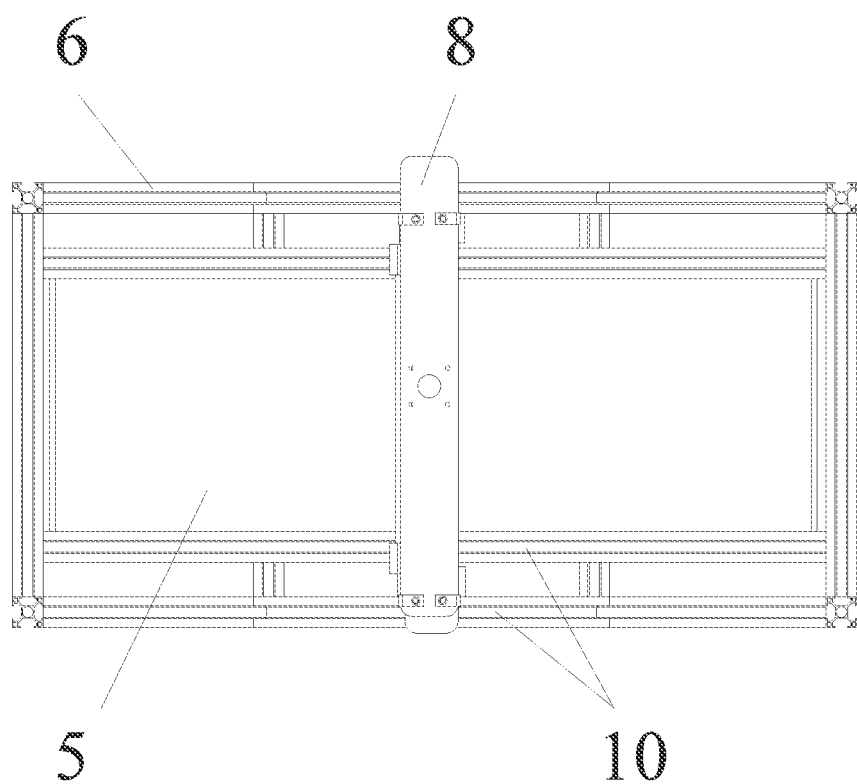
FIG. 5 is a top view of the frame structure in the present disclosure.
Figure 6:
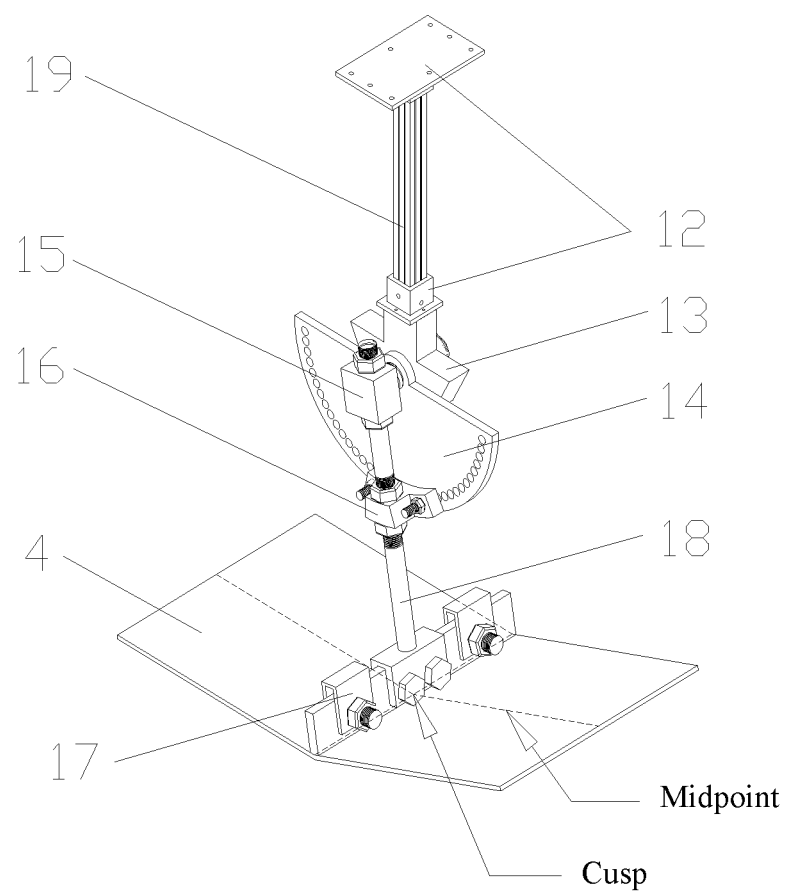
FIG. 6 is an axonometric drawing of the obliquing device and the wedge in the present disclosure.
Figure 7:
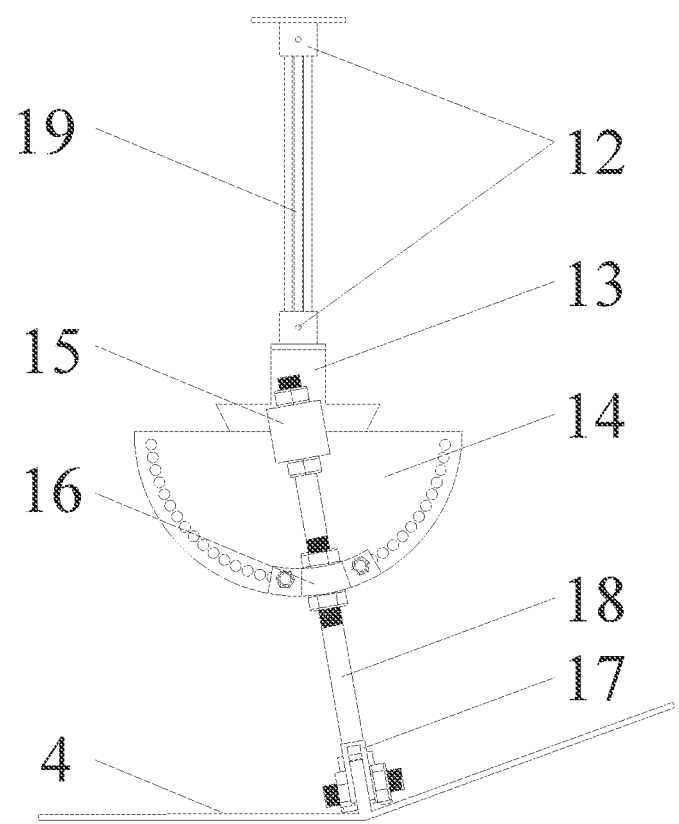
FIG. 7 is a front view of the obliquing device and the wedge in the present disclosure.
Figure 8:
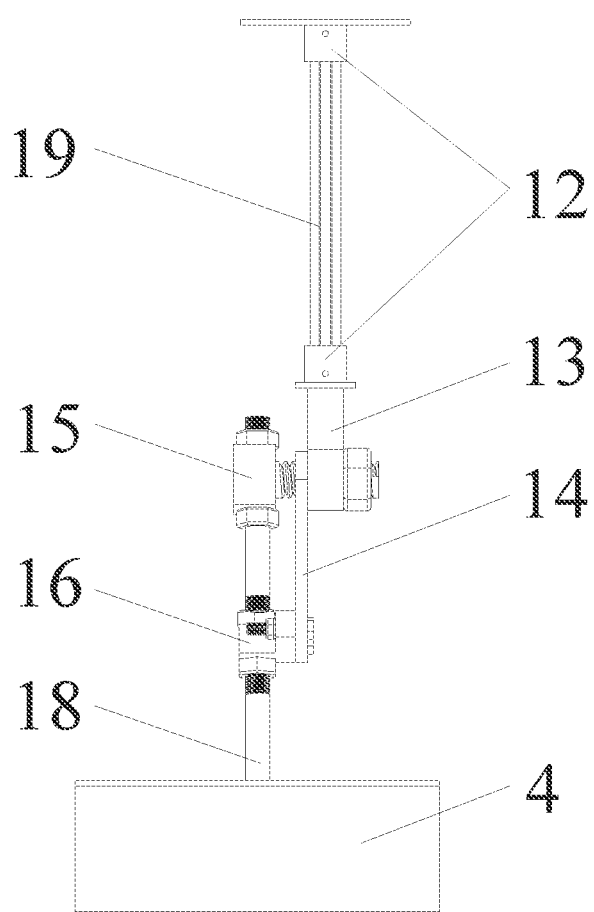
FIG. 8 is a side view of the obliquing device and the wedge in the present disclosure.
Figure 9:
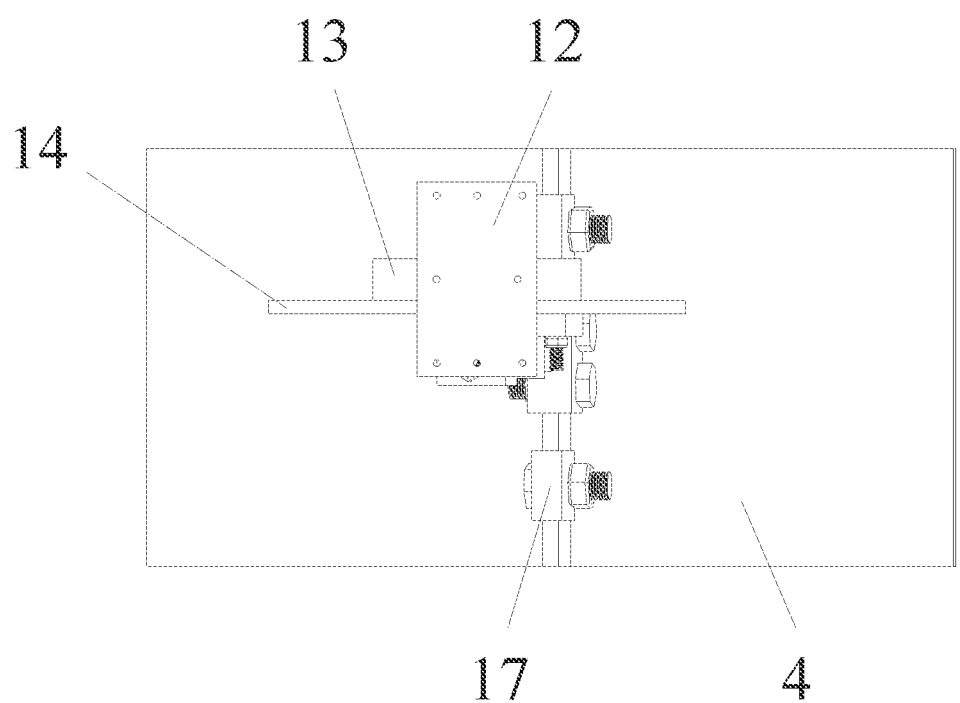
FIG. 9 is a top view of the obliquing device and the wedge in the present disclosure.

As shown in FIGS. 1 to 9, the present disclosure provides a test device suitable for acceleratory obliquing water entry of a wedge 4, including a frame 1, a water tank 5 placed below the frame 1, an accelerator 2 mounted above the frame 1, a obliquing device 3 connected to the frame 1, a wedge 4 connected to the obliquing device 3 and an observation system.

The frame 1 includes a support 6 and linear slide rails placed on the support 6. The support 6 is a rectangular frame 1 made of aluminum profile and has a hollow structure composed of top profile and support profile perpendicular to the top profile. The top profile is a hollow rectangle composed of long profiles arranged horizontally and symmetrically on both sides and short profiles arranged horizontally and symmetrically and perpendicular to the long profiles. The four corners of the top profile are respectively vertically fixed with support profiles, and at least four support profiles are provided. The water tank 5 is placed below the top profile and is arranged on a movable base which is assembled by aluminum profile into a rectangular frame slightly larger than the water tank 5, and the four corners of the rectangular frame are equipped with wheels. The movable base is a prior art, which is not shown in the figures. The long profiles on both sides are provided with vertical slide rails 7 symmetrically arranged. The vertical slide rail 7 and the long profile are jointly connected with a local reinforcement 10 (the local reinforcement 10 is arranged at both sides of the length direction of the connection between the vertical slide rail 7 and the long profile and the bottom of that) to make the vertical slide rail 7 more stable. The local reinforcement 10 mainly includes two structures, one is aluminum profile reinforcement, for fixing the base of the vertical slide rail 7, parallel to the long profile of the top profile in the frame 1; the other is aluminum profile reinforcement with chamfers of 45° at both ends, fixed at the two sides of the vertical slide rail 7 to limit the swing of the vertical slide rail 7 in the test process. The vertical slide rails 7 on both sides are symmetrically provided with slide blocks, and the slide blocks on both sides are respectively connected at both ends of the transverse slide rail 9. The transverse slide rail 9 is provided with a fastening slide block which is fixedly connected with the obliquing device 3. The lower parts of the vertical slide rails 7 on both sides are provided with buffer springs 11 for buffering the impact force of the high-speed falling of the whole transverse slide rail 9. The upper ends of the vertical slide rails 7 on both sides are jointly connected with a subplate 8. The upper ends of the vertical guide rails 7 on both sides are respectively connected with both sides of the subplate, and the middle part of the subplate 8 is provided with a through hole for fixing the accelerator 2. The position of the subplate 8 is adjustable in the horizontal direction, and the subplate 8 can move left and right along the direction perpendicular to the long profiles of the top profile. The subplate 8 is fixedly connected with the vertical slide rail 7 through the C-shaped clamps after the position is adjusted. Both sides of each end of the subplate 8 are provided with a C-shaped card respectively, that is, each end of the subplate 8 is fixedly connected with the vertical slide rail 7 through two C-shaped clamps. By adjusting the position of the subplate 8, the position of the air cylinder fixed on the subplate 8 is adjusted, thereby the piston rod of the air cylinder can accurately connect with a surface of the fastening slide block plane of the transverse slide rail 9.

The accelerator 2 includes an air cylinder and an air compressor. The air compressor drives the air cylinder to generate thrust to push the fastening slide block of the transverse slide rail 9 to achieve an acceleration of the wedge 4 and the obliquing device 3. By controlling different output pressure of the air compressor, the air cylinder generates different thrust to achieve different water entry velocity of the wedge 4. A head of the piston rod of the air cylinder is provided with a flat plate having the same area of top of the fastening slide block of the transverse slide rail 4, which can increase the contact area between the head and the slide block to provide more stable and uniform force. The air cylinder selects the model with a cylinder diameter of 80 mm and a stroke of 300 mm, which can continuously output the force of maximum 300 kg.

The obliquing device 3 includes a support rod. The upper end of the support rod is connected with the fastening slide block and the lower end is connected with a positioning block 13. The support rod includes a second aluminum profile 19 and sleeves 12 having a plane installed at the upper and lower ends of the second aluminum profile 19. The sleeve 12 at the upper end is connected to the fastening slide block, and the sleeve 12 at the lower end is connected to the positioning block 13. One side of the positioning block 13 is connected with the angle-modulated semicircle 14. The positioning block 13 and the angle-modulated semicircle 14 are provided with communicated threaded holes, and the two threaded holes are jointly connected by a rotatable connecting bolt 15. In order to limit the displacement of the connecting bolt 15 along the direction of the extension rod, some gaskets are provides at both sides of the angle-modulated semicircle 14. The relative position of the positioning block 13, the angle-modulated semicircle 14 and the connecting bolt 15 is adjusted by rotation of connecting bolt in the thread; and in case of clearance, the gaskets should be installed at the required position to limit the displacement along the axial direction of the connecting bolt 15. The head of the connecting bolt 15 is a cuboid block on which is provided with a first through hole, and an axis of the first through hole is parallel to the semicircular surface of the angle-modulated semicircle 14. An extension rod 18 is connected in the first through hole, and the middle part of the extension rod 18 is in threaded connection with an angle-modulated block 16. The extension rod 18 passes through the threaded hole in the angle-modulated block 16, and the angle-modulated block 16 is connected with the angle-modulated semicircle 14. The lower end of the extension rod 18 is connected with the wedge 4, to achieve the wedge 4 obliquely falling at the desired angle through the whole obliquing device 3.

The edge of the angle-modulated semicircle 14 is provided with a circle of first threaded holes spaced at an angle of 5°. Both sides of the angle-modulated block 16 are provided with second threaded holes spaced at an angle of 10°. The angle-modulated block 16 is fixedly connected with the angle-modulated semicircle 14 by the bolt jointly connected in the second threaded holes and the first threaded holes, wherein a curvature of the second threaded hole is the same as a distance from the first threaded hole to a center of the angle-modulated semicircle 14. Therefore, in order to enable the extension rod 18 reach the desired obliquing angle, the two second threaded holes of the angle-modulated block 16 connect to the first threaded holes with the corresponding angle of the angle-modulated semicircle 14 plus or minus 5°, and the threaded holes of the two devices are screwed together with bolts to fix.

The upper and lower sides of the connection between the connecting bolt 15 and the extension rod 18 are provided with at least two nuts, and the upper and lower sides of the connection between the angle-modulated block 16 and the extension rod 18 are provided with at least two nuts. The connection between the extension rod 18 and the connecting bolt 15 and the connection between the extension rod 18 and the angle-modulated block 16 are both provided with external threads. The longitudinal displacement of the extension rod 18 is limited by setting nuts on the upper and lower sides of the connecting bolt 15 and the angle-modulated block 16.

The wedge 4 is a flexible wedge 4 or a rigid wedge 4. The flexible wedge 4 is an aluminum plate with a thickness of 5 mm, a length of 600 mm and a width of 300 mm, and the deadrise angles of 10°, 15° and 20° are respectively folded from the cusps. The rigid wedge 4 is to cover the side not in contact with water of the plate with a board on the basis of the flexible wedge 4 to meet the requirements of rigidity. A weight of the flexible wedge 4 is the same as that of the rigid wedge 4, wherein the flexible wedge 4 is added a counterweight 17 the same as the weight of the board. A thick plate with holes is welded on the line the wedge cusp located, wherein the holes are symmetrically arranged on both sides of the thick plate for installing the counterweight 17 to adjust the weight of the whole wedge 4 device. The thick plate with holes welded on the line the cusp of the wedge 4 located can not only enable the flexible deformation at the cusp small, but also provide the installation holes for connecting the extension rod.

The observation system includes pressure sensors, strain sensors, a velocity sensor, an acceleration sensor and a particle image velocimetry device. The pressure sensors are arranged at the cusp of the wedge and a midpoint on one side of that for measuring the pressure at specific points. The strain sensors are arranged at the cusp of the wedge 4 and a midpoint on one side of the wedge 4 for measuring the deformation at specific points. The velocity sensor is arranged on the plate at the upper side of the wedge 4 cusp for measuring the velocity when the wedge entering the water. The acceleration sensor is arranged on the upper part of the wedge 4 for obtaining the resultant force on the wedge 4. Tracer particles in the particle image velocimetry device are placed in the water, a laser lamp is arranged in the water tank 5 frame, and a high-speed camera is arranged in front of the water tank 5 to monitor a change of fluid velocity under the wedge 4. A variety of sensors can be arranged on the test device to observe the different physical quantities in the test process. The variety of sensors and high-speed camera images constitute the complete observation system of the entire device.

In the embodiment, the design of the frame 1 mainly meets two requirements: 1. The frame can be arranged with water tank 5, and can be assembled with the accelerators 2 (air cylinders and air compressors), various sensors, the obliquing device 3 (angle-modulated device), the wedge 4 fixing device, the high speed-camera and the laser lamp for PIV, etc.; 2. The frame can withstand the impact force of the wedge 4 and other devices falling at high speed. Based on the above two requirements, the large-size 6060 aluminum profile is used to build the whole frame 1, and the necessary reinforcing device and buffer device are added at the local position. The reinforcing device is the local reinforcement 10 for stabilizing the vertical slide rails 7; the buffer device is the buffer spring 11 installed at the lower part of the vertical slide rail 7, and the two ends of the transverse slide rail 9 are respectively connected with a flexible rope, and the other ends of the two flexible ropes are connected with the two ends of the subplate 8, for buffering the impact force of high-speed falling and protecting the device.

In the embodiment, the whole test device is about 2 m high, which is compact in structure and convenient in implementation.

In the embodiment, the core parts of the tilting device 3 are the angle-modulated semicircle 14 and the angle-modulated block 16. By combining these two devices and the connecting bolt 15 assembled at the angle-modulated semicircle 14 to fix the extension rod 18 of the wedge 4, the wedge 4 always obliques at a fixed angle during the test.

Embodiment 2

In the working process, the test device undergoes three processes: balance state, acceleration process and buffer process.

The balance state: electromagnets are installed on the platforms extended from the vertical slide rails 7 on both sides for catching the two ends of the transverse slide rail 9. The air compressor does not work, and the transverse slide rail 9 is balance at the top of the stroke and ready to fall. The electromagnet enables the wedge 4 and the obliquing device 3 in a balance state by catching the transverse slide rail 7. The electromagnet is the prior art, which is not shown in the figures.

The acceleration process: the acceleration process comprises two steps, respectively, the acceleration process of a larger acceleration generated by the air cylinder thrust in the stroke of the air cylinder, and the acceleration process of free fall of the transverse slide rail 9 outside the cylinder stroke.

The buffer process: after water entry observation of the wedge 4 device is completed, the slide block of the vertical slide rail moves to a position of a buffer spring and decelerates under an action of the buffer spring. The slide block stops under the action of tension of the flexible ropes when the whole stroke reaches the rope length of the flexible ropes.

In the working process, the electromagnets are first energized to catch the obliquing device 3 and the wedge 4 connected with the transverse slide rail 9, and then start the air compressor so that the air cylinder starts to work. After one second, the electromagnets are disconnected, and the wedge 4 is accelerated within the stroke of the air compressor to make an approximate free fall.

Embodiment 3

Calculation of the output pressure of the air cylinder and the falling velocity:

The configuration and weight of each device are calculated according to the solution requirements. Assuming that the weight distribution of the whole test device is concentrated in the middle, considering the factors such as the friction loss of the vertical slide rail, the whole device is analyzed and calculated as follows:

1. According to the model measurement, the distance between the wedge 4 and the water surface, i.e. the effective acceleration distance, is about 756 mm. To obtain the velocity to be reached by the cylinder push, the approximate free fall after the cylinder push is calculated (removing the friction loss and assuming the acceleration of $g_1=9.8$ m/s$^2$), and the total displacement of the movement is 756 mm−200 mm=556 mm. In order to reach the velocity of 7 m/s when falling to the water surface, then:

$$\begin{cases} v_0 t + \frac{1}{2} g_1 t^2 = 0.556 \\ v_0 + gt = 7 \end{cases}$$

thereby obtaining t=0.0844 and $v_0$=6.173 m/s.

2. An air cylinder with a cylinder diameter of 80 mm and a stroke of 0.2 m is selected, which can continuously output a force of maximum 300 kg within the stroke. The wedge 4 is pushed by the air cylinder to reach a velocity of 6.256 m/s within the stroke, then:

$$\begin{cases} at = 6.173 \\ \frac{1}{2} at^2 = 0.2 \end{cases}$$

thereby obtaining t=0.0648 s and a=95.256 m/s$^2$.

3. Since F=ma, in order to get the force, it is necessary to calculate and get the weight of the acceleration device first.

The total weight of the acceleration device=0.7 m×the weight of the transverse slide rail+the weight of the fastening slide block+the weight of the connecting rod+the weight of the angle-modulated device+the weight of the wedge =10.45 kg×0.7+0.159 kg+0.27 kg+(1.21527+
0.50432+3.06504+2.4044)×10$^{-4}$×7930 kg/m$^3$
(stainless steel)+6.998 kg =7.315 kg+0.159 kg+0.27 kg+5.70 kg+6.998 kg =20.44 kg 4. To facilitate estimation, a resistance coefficient of 1.1 is selected.

$F_{total}$=cma=1.1×20.44 kg×95.256 m/s$^2$=2141.736
N=air cylinder thrust−resistance thereby the air cylinder thrust>2141.736 N.

5. The contact area between the air cylinder and the fastening slide block is:

S=L×W=86 mm×140 mm=0.01204 m$^2$, thereby the pressure that the air compressor needs to provide to the air cylinder is P=F/S=0.1779 MPa.

According to the method, the minimum pressure of the air cylinder corresponding to each velocity is obtained as follows:

| Velocity (m/s) | Falling height (Distance from the water surface/m) | Air cylinder acceleration (m/s$^2$) | Minimum external force of air cylinder(N) | Minimum air pressure of air cylinder (Mpa) |
| --- | --- | --- | --- | --- |
| 2 | 0.204 | 0 | 0 | 0 |
| 3 | 0.459 | 0 | 0 | 0 |
| 3.303 | 0.556 | 0 | 0 | 0 |
| 4 | 0.556 | 12.756 | 286.805 | 0.02382 |
| 5 | 0.556 | 35.256 | 792.696 | 0.06584 |
| 6 | 0.556 | 62.756 | 1411.006 | 0.1172 |
| 7 | 0.556 | 95.256 | 2141.736 | 0.1779 |
| 8 | 0.556 | 132.756 | 2984.886 | 0.2479 |
| 9 | 0.556 | 175.256 | 3940.456 | 0.3273 |
| 10 | 0.556 | 222.756 | 5008.446 | 0.4160 |

At last, it should be stated that the above various embodiments are only used to illustrate the technical solutions of the present invention without limitation; and despite reference to the aforementioned embodiments to make a detailed description of the present invention, those of ordinary skilled in the art should understand: the described technical solutions in above various embodiments may be modified or the part of or all technical features may be equivalently substituted; while these modifications or substitutions do not make the essence of their corresponding technical solutions deviate from the scope of the technical solutions of the embodiments of the present disclosure.

The invention claimed is:

1. A test device suitable for acceleratory oblique water entry of a wedge, comprising: a frame, a water tank placed below the frame, an accelerator mounted above the frame, an obliquing device connected to the frame, a wedge connected to the obliquing device, and an observation system, wherein;
  the frame comprises a support and linear slide rails arranged on the support;
  the support is a rectangular frame made of aluminum profile and has a hollow structure composed of a top profile and a support profile perpendicular to the top profile;
  the water tank is placed below the top profile and is arranged on a movable base;
  long profiles arranged on two sides of the top profile are provided with vertical slide rails symmetrically arranged;
  the vertical slide rail and the long profile are jointly connected with a local reinforcement;
  the vertical slide rails on both sides are symmetrically provided with slide blocks, and the slide blocks on both sides are respectively connected to two ends of a transverse slide rail;
  the transverse slide rail is provided with a fastening slide block which is fixedly connected with the obliquing device;
  the upper ends of the vertical slide rails on both sides are jointly connected with a subplate, and a middle part of the subplate is provided with a through hole for fixing the accelerator;
  the accelerator comprises an air cylinder and an air compressor;
  the air compressor drives the air cylinder to generate thrust to push the fastening slide block of the transverse slide rail to achieve an acceleration of the wedge and the obliquing device;

by controlling different output pressure of the air compressor, the air cylinder generates different thrusts to achieve different water entry velocities of the wedge;

a head of a piston rod of the air cylinder is provided with a flat plate having the same area of the top of the fastening slide block of the transverse slide rail, which is used to increase a contact area between the head and the slide block to provide more stable and uniform force;

the obliquing device comprises a support rod;

an upper end of the support rod is connected with the fastening slide block and a lower end is connected with a positioning block;

one side of the positioning block is connected with an angle-modulated semicircle;

the positioning block and the angle-modulated semicircle are provided with communicated threaded holes, and the two threaded holes are jointly connected by a rotatable connecting bolt;

a head of the connecting bolt is a cuboid block on which is provided with a first through hole, and an axis of the first through hole is parallel to a semicircular surface of the angle-modulated semicircle;

an extension rod is connected in the first through hole, and a middle part of the extension rod is in connection with an angle-modulated block connected with the angle-modulated semicircle;

a lower end of the extension rod is connected with the wedge to achieve the wedge obliquely falling at a desired angle through the whole obliquing device;

the wedge is a flexible wedge or a rigid wedge;

the observation system comprises pressure sensors, strain sensors, a velocity sensor, an acceleration sensor and a particle image velocimetry device;

the pressure sensors are arranged at a cusp of the wedge and a midpoint on one side of that for measuring the pressure at specific points;

the strain sensors are arranged at the cusp of the wedge and a midpoint on one side of that for measuring the deformation at specific points; the velocity sensor is arranged at a vertical plate on the cusp of the wedge for measuring the velocity when the wedge entering the water;

the acceleration sensor is arranged at the vertical plate on the cusp of the wedge for acquiring the resultant force on the wedge;

tracer particles of the particle image velocimetry device are placed in the water, a laser lamp is arranged in the water tank frame, and a high-speed camera is arranged in front of the water tank, to monitor a change of fluid velocity under the wedge;

during a working process, the test device undergoes a balance state, an acceleration process and a buffer process;

the balance state comprises installing electromagnets on platforms extended from the vertical slide rails on both sides for catching the two ends of the transverse slide rail, the air compressor is not running, thereby the transverse slide rail is in balance at a top of a stroke and ready to fall;

the acceleration process comprises an acceleration process of a larger acceleration generated by the air cylinder thrust in the stroke of the air cylinder, and an acceleration process of free fall of the transverse slide rail outside the cylinder stroke; and in the buffer process, after water entry observation of the wedge is completed, the slide block of the vertical slide rail moves to a position of a buffer spring and decelerating under an action of the buffer spring, the slide block stops under the action of tension of a flexible rope when the whole stroke reaches a rope length of the flexible rope.

2. The test device suitable for acceleratory oblique water entry of a wedge according to claim 1, wherein lower parts of the vertical slide rails on both sides are provided with buffer springs for buffering the impact force of the transverse slide rail falling at high speed.

3. The test device suitable for acceleratory oblique water entry of a wedge according to claim 1, wherein a position of the subplate is adjustable in a horizontal direction; the subplate can move horizontally along a direction of connection of upper ends of the two vertical slide rails; after adjusting the position, the subplate is fixedly connected with the vertical slide rails through C-shaped clamps; by adjusting the position of the subplate, the piston rod of the air cylinder can accurately connect with a surface of the fastening slide block of the transverse guide rail.

4. The test device suitable for acceleratory oblique water entry of a wedge according to claim 1, wherein the support rod comprises a second aluminum profile and sleeves having a plane and installed at both ends of the second aluminum profile; the sleeve located at an upper end is connected with the fastening slide block, and the sleeve at a lower end is connected with the positioning block.

5. The test device suitable for acceleratory oblique water entry of a wedge according to claim 1, wherein an edge of the angle-modulated semicircle is provided with a circle of first threaded holes spaced at an angle of 5°; both sides of the angle-modulated block are provided with second threaded holes spaced at an angle of 10°; the angle-modulated block is fixedly connected with the angle-modulated semicircle by the bolt jointly connected in the second threaded holes and the first threaded holes, wherein a curvature of the second threaded hole is the same as a distance from the first threaded hole to a center of the angle-modulated semicircle.

6. The test device suitable for acceleratory oblique water entry of a wedge according to claim 1, wherein the upper and lower sides of the connection between the connecting bolt and the extension rod are provided with at least two nuts, and the upper and lower sides of the connection between the angle-modulated block and the extension rod are provided with at least two nuts, for limiting the longitudinal displacement of the extension rod.

7. The test device suitable for acceleratory oblique water entry of a wedge according to claim 1, wherein two ends of the transverse slide rail are connected with flexible ropes, and the other ends of the two flexible ropes are respectively connected with two ends of the subplate.

8. The test device suitable for acceleratory oblique water entry of a wedge according to claim 1, wherein the flexible wedge is a plate with a thickness of 5 mm, a length of 600 mm and a width of 300 mm, and deadrise angles of 10°, 15° and 20° are respectively folded from the cusp of the plate; the rigid wedge is to cover the side not in contact with water of the plate with a board on the basis of the flexible wedge to meet the requirements of rigidity; a weight of the flexible wedge is the same as that of the rigid wedge, wherein the flexible wedge is added a counterweight the same as the weight of the board; a thick plate with holes is welded on the line the wedge cusp located, wherein the holes are symmetrically arranged on two sides of the thick plate for installing counterweight to adjust the weight of the whole wedge device.

9. The test device suitable for acceleratory oblique water entry of a wedge according to claim 1, wherein two sides of the angle-modulated semicircular are provided with gaskets for limiting the displacement of the connecting bolt along a direction of the extension rod.

* * * * *